(No Model.)

R. B. SWIFT.
EYEGLASS CASE.

No. 497,734.　　　　　　　　　　Patented May 16, 1893.

WITNESSES
Carrie E. Nichols.

INVENTOR
Robert B. Swift
Per Edwin W. Brown
ATT'Y

UNITED STATES PATENT OFFICE.

ROBERT B. SWIFT, OF PORTLAND, MAINE.

EYEGLASS-CASE.

SPECIFICATION forming part of Letters Patent No. 497,734, dated May 16, 1893.

Application filed June 14, 1892. Serial No. 436,689. (No model.)

*To all whom it may concern:*

Be it known that I, ROBERT B. SWIFT, of Portland, in the county of Cumberland and State of Maine, have invented certain new and useful Improvements in Eyeglass-Cases, of which the following is a full, clear, and exact description.

This invention relates to a case for eye glasses more especially intended for eye glasses that have the nose portion of their frames offset, and the invention consists of a case for eye glasses constructed and arranged for use all substantially as hereinafter fully described and shown, reference being had to the accompanying sheet of drawings in which is illustrated an eye glass case constructed in accordance with this invention.

Figure 1:
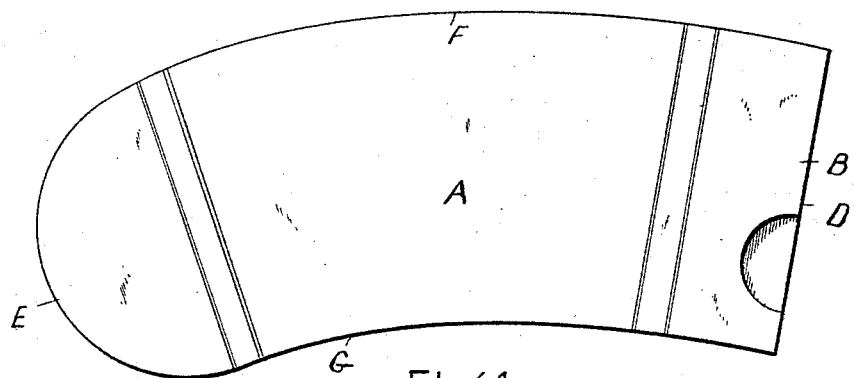
Figure 2:
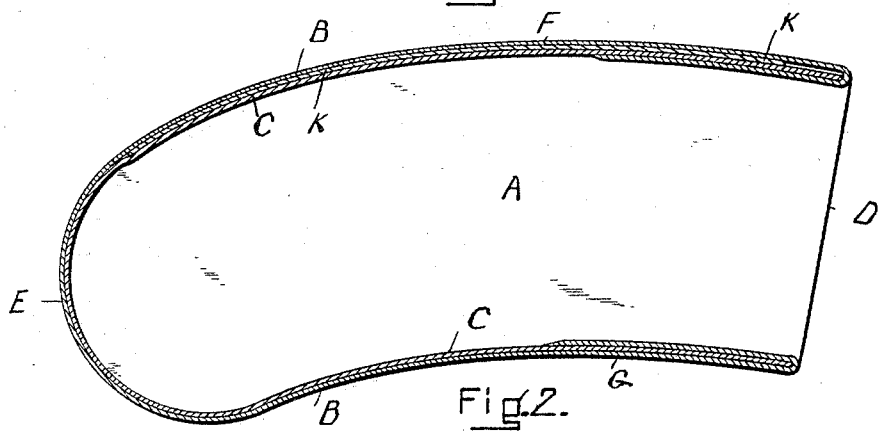
Figure 4:
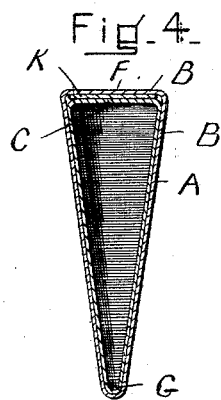
Figure 3:
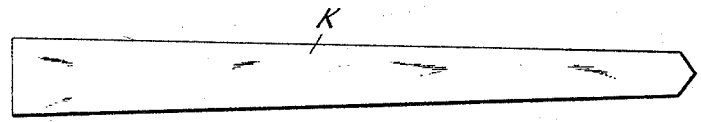
Figure 5:
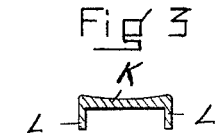

Figure 1, is a side view; Fig. 2, a longitudinal central section. Fig. 3, is a side view of one of the parts. Fig. 4, is a cross section, and Fig. 5, is a cross section of one of the parts.

In the drawings A represents an eye glass case made of leather B, with a lining C of any suitable material, having one end D, open at which the eye glass is inserted and the other end E closed, and of a shape in side view having its outer or back edge F, and inner edge G, in curved lines to correspond to the general shape of the eye glass when open for use, to receive them in their open position, all substantially as usual and needing no particular description herein except as to the present invention.

The material of which the case is made is folded so that its inner curved edge G, will be closed upon itself as shown in cross section, in Fig. 4, which is comparatively a thin fold, but the back or outer curved edge F, of the case has practically two folds making a wide edge as shown in cross section in Fig. 4, in which, between the leather B and the lining C is secured in any suitable manner a flat piece K, preferably of steel bent or curved in the outline desired for back of the case. As the case is intended to be thicker at its open end than at its closed end, the metal strip is wider at the open end, and tapering toward its other end, as shown in Fig. 3, which is a side view of the metal strip alone turned round from Figs. 1 and 2. The strip as shown in Fig. 3, is a flat plain strip but in Fig. 5, the strip is shown in cross section having flanges at its side edges as at L, which make broader edges to prevent the casing from being worn or cut by the strip, and also making the strip somewhat stiffer. This metal strip serves to keep the back curved edge F rigid, preventing the case itself from being depressed or closed upon itself, especially if when lying on the table or desk any heavy substance should be placed thereon.

Offset eye glasses as is well known have the nose portions of their frames somewhat at an angle to the portions of the frames in which the glass is secured projecting sidewise therefrom, and the present case allows for such by having its back portion much deeper or wider to allow room in the case for such offset portion, and with the metal strip in the back edge, the edge is held up firmly so that with anything laid on the case with the eye glasses therein, or when in the pocket of the person carrying them the metal strip will prevent any pressure therefrom upon the eye glass frames and thus prevent their breakage.

The case can be straight in lieu of having its edges curved, although it is preferable to have them curved for the purpose stated.

Having thus described my invention, what I claim is—

1. A case for an eye glass having its two edges longitudinally in curved lines, the inner curved edge of a thin or close fold, the back or outer curved edge of a wide fold and a flat metal strip secured between the outer covering and the lining along the back edge, of a width of and longitudinally bent or curved to correspond to the outer or back edge.

2. A case for an eye glass having its two edges longitudinally in curved lines, the inner edge of a thin or close fold, the back or outer curved edge of a wide fold and a flat metal strip having its longitudinal edges flanged or bent, secured between the outer covering and the lining along the back edge, of a width of and longitudinally bent or curved to correspond to the outer or back edge.

3. A case for an eye glass, one edge being of a thin or close fold, the other edge of a wide fold and a flat metal strip secured between the outer covering and the lining along the wide folded edge and of a width of such edge.

4. A case for an eye glass, one edge being of a thin or close fold, the other edge of a wide fold, and a flat metal strip secured at the wide folded edge.

In testimony whereof I have hereunto set my hand in the presence of two subscribing witnesses.

ROBERT B. SWIFT.

Witnesses:
CHARLES L. DRUMMOND,
FRANK A. BOOTHBY.